(12) United States Patent
Igawa

(10) Patent No.: US 6,435,547 B2
(45) Date of Patent: Aug. 20, 2002

(54) METHOD OF FOLDING AIR BAG FOR DRIVER

(75) Inventor: Tadahiro Igawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/851,969

(22) Filed: May 10, 2001

Related U.S. Application Data

(63) Continuation of application No. 09/793,728, filed on Feb. 27, 2001.

(30) Foreign Application Priority Data

Feb. 28, 2000 (JP) .......................................... 2000-051904

(51) Int. Cl.[7] .............................................. B60R 21/20
(52) U.S. Cl. ................................... 280/731; 280/743.1
(58) Field of Search ............................... 280/731, 743.1, 280/728.1, 728.2; 493/243, 405, 451, 940; 53/116, 117, 429

(56) References Cited

U.S. PATENT DOCUMENTS

| | | | | |
|---|---|---|---|---|
| 3,768,824 A | * | 10/1973 | Kloppe et al. | 280/731 |
| 5,529,339 A | * | 6/1996 | Niederman | 280/743.1 |
| 5,564,730 A | * | 10/1996 | Chizenko et al. | 280/728.1 |
| 5,690,358 A | * | 11/1997 | Marotzke | 280/743.1 |
| 5,865,465 A | * | 2/1999 | Bauer et al. | 280/743.1 |
| 6,007,088 A | * | 12/1999 | Yamamoto et al. | 280/728.3 |
| 6,170,870 B1 | * | 1/2001 | Marotzke | 280/743.1 |

* cited by examiner

Primary Examiner—Paul N. Dickson
Assistant Examiner—David R. Dunn
(74) Attorney, Agent, or Firm—Kanesaka & Takeuchi

(57) ABSTRACT

In a method of folding an air bag for a driver, an air bag is placed in a flat form to orient an upper surface of the air bag upwardly. Then, at least two side areas of the air bag in the flat form are folded inwardly of the air bag so that at least two arm portions extending radially outwardly from a center portion of the air bag to lateral portions on an outer periphery of the air bag are formed. The air bag for the driver is folded compact.

12 Claims, 19 Drawing Sheets

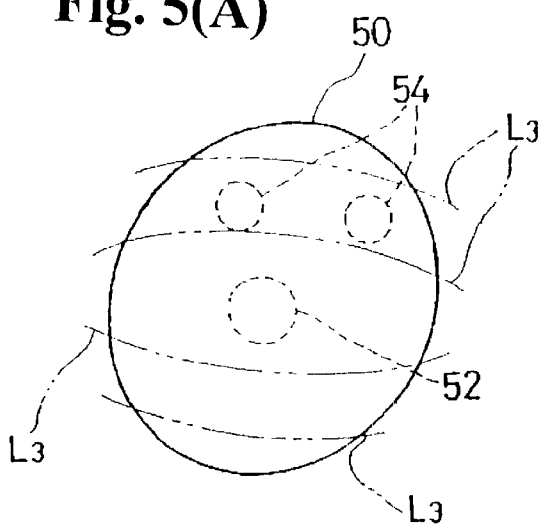
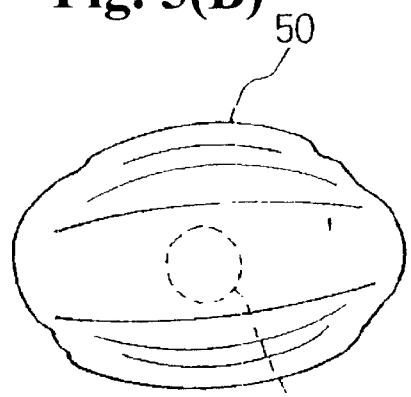
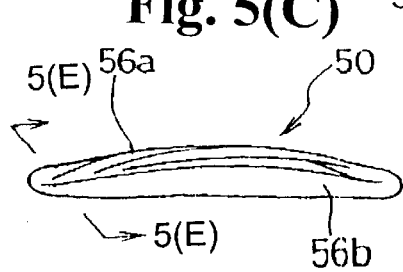
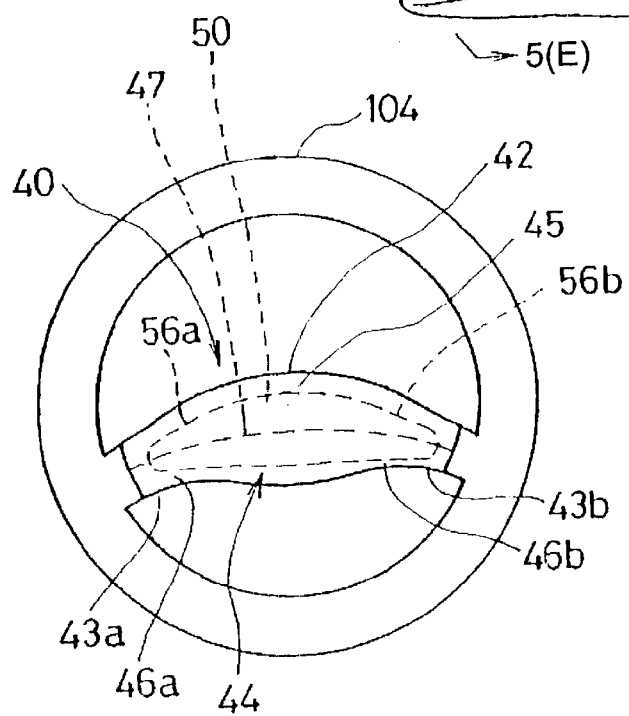
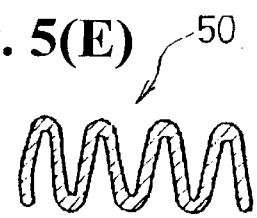

130, 132, 134:

METHOD OF FOLDING AIR BAG FOR DRIVER

CROSS-REFERENCE TO RELATED APPLICATION

This is a continuation application of patent application Ser. No. 09/793,728 filed on Feb. 27, 2001.

BACKGROUND OF THE INVENTION AND RELATED ART STATEMENT

The present invention relates to a method of folding an air bag for a driver to be mounted on the steering of the automobile.

Referring now to FIGS. 23(A) and 23(B), an example of an air bag apparatus for a driver's seat according to the related art will be described. FIG. 23(A) is a plan view of an air bag apparatus for a driver's seat according to the related art, and FIG. 23(B) is a cross sectional view taken along line 23(B)—23(B) in FIG. 23(A), and FIG. 24 is a perspective view showing a modular cover viewed from the backside.

A retainer 110 comprises a flat plate portion 114 to which an air bag 112 is attached, and a module cover connecting portion 116 which is a strip extending from the edge of the flat plate portion 114 to the direction opposite to a driver. The air bag 112 in the folded state is covered with a module cover 118. The module cover 118 comprises a main plate 118A facing the driver and leg portions 118B extending from the side portion of the main plate in the direction opposite to the driver. The leg portions 118B are secured to the module cover connecting portion 116 of the retainer 110 by rivets 120 or the like. The reference numeral 122 designates a reinforcing plate.

An inflator 124 is secured to the retainer 110 in such a manner that the upper side thereof is accommodated in the air bag 112 through an opening 126 formed on the flat plate portion 114. A ring 128 is an air bag connecting member. The opened edge of the air bag 112 is sandwiched between the ring 128 and the opened edge portion of the flat plate portion 114, so that the air bag 112 is secured to the retainer 110. Bolts, not shown, which are fixed to the ring 128, are inserted into bolt insertion holes formed at the opened edge of the air bag 112, the flat plate portion 114 of the retainer, and a flange 124a of the inflator 124, and nuts are tightened onto the bolts.

The back surface of the main plate 118A of the module cover 118 has tear lines 130, 132, 134 of shallow grooves formed as weakened portion for ripping the main plate 118A. The tear lines 130, 132 extend along the leg portions 118B on the left side and the right side in FIG. 23(A) in the vertical direction of FIG. 23(A). The tear line 134 extends laterally of FIG. 23(A) at about the center of the main plate 118A so as to connect the tear lines 130 and 132 together.

The main plate 118A of the module cover surrounded by these tear lines 130, 132 and 134 are divided into two sections, i.e. flaps 140 and 142. When the inflator 124 is operated to blow gas to inflate the air bag 112, the portions of the module cover 118 along the tear lines 130, 132 and 134 are torn or ripped, so that the flaps 140, 142 can be outwardly opened respectively into a tongue shape.

When the inflator 124 operates in association with the collision of the vehicle, a large amount of gas is rapidly blown out from the inflator 124 and the air bag 112 starts to inflate. Then, the module cover 118 is ripped along the tear lines 130, 132 and 134 in association with the inflation of the air bag 112, and the flaps 140 and 142 are respectively opened into a tongue shape, so that the air bag 112 is rapidly inflated in the compartment of the vehicle to protect the driver therein.

Though the air bag apparatus for a driver's seat comprises three spoke portions 151, 152 and 153, an air bag apparatus for a driver's seat having two or four spoke portions is also widely used.

FIG. 25 is a perspective view of a steering wheel 165 having an air bag apparatus for a driver's seat 160 having four spoke portions 161, 162, 163 and 164. There is also provided a tear line 167 on a module cover 166 of the air bag apparatus for a driver's seat 160.

The module cover 118 or 166 of the above described related air bag apparatus for a driver's seat comprises a center portion and spoke portions extending from the center portion radially outwardly, and the air bag is covered only with the center portion.

In this way, in the air bag apparatus for the driver's seat covered only with the center portion of the module cover 118 or 166, the module cover and the air bag apparatus are significantly large because they have to cover the air bag.

Accordingly, in view of the above problem of the related art, the object of the present invention is to provide an air bag apparatus for a driver's seat having relatively small and slim appearance.

SUMMARY OF THE INVENTION

In a method of folding an air bag for a driver, an air bag is placed in a flat form to orient an upper surface of the air bag upwardly, and then, at least two side areas of the air bag in the flat form are folded inwardly of the air bag so that at least two arm portions extending radially outwardly from a center portion of the air bag to lateral portions on an outer periphery of the air bag are formed without being folded toward the center of the air bag. The arm portions have elongated shapes extending along spokes of a steering wheel.

Each of the at least two side areas of the air bag is placed at the center portion and at least two arm portions. Preferably, each of the at least two side areas is folded in bellows so that folded portions in a form of bellows extend between the lateral portions through the center portion.

The folded air bag may have three or more arm portions extending from the center portion according to the number of the spokes of the steering wheel.

In the method of the invention, at least three side areas of the air bag in the flat form may be pushed toward the center portion to form at least three petal-shaped portions extending radially outwardly from the center portion, and side portions of each petal-shaped portion are rolled inwardly to form the arm portion. On the other hand, each of the upper and lower sides of the air bag in the flat form may be folded in bellows and disposed on a middle area between the upper and lower sides without overlapping each other to form an elongated form. Also, each of upper and lower sides of the air bag in the flat form may be rolled inwardly toward a center area without overlapping each other.

In the method of the invention, the air bag can be folded from the center to the spokes of the steering wheel. Thus, the center of the steering wheel can be made relatively compact.

BRIEF DESCRIPTION OF THE DRAWINGS

FIGS. 5(A)–5(E) are explanatory drawings showing an air bag apparatus for a driver's seat according to a further embodiment of the present invention;

DETAILED DESCRIPTION OF PREFERRED EMBODIMENTS

Figure 1:
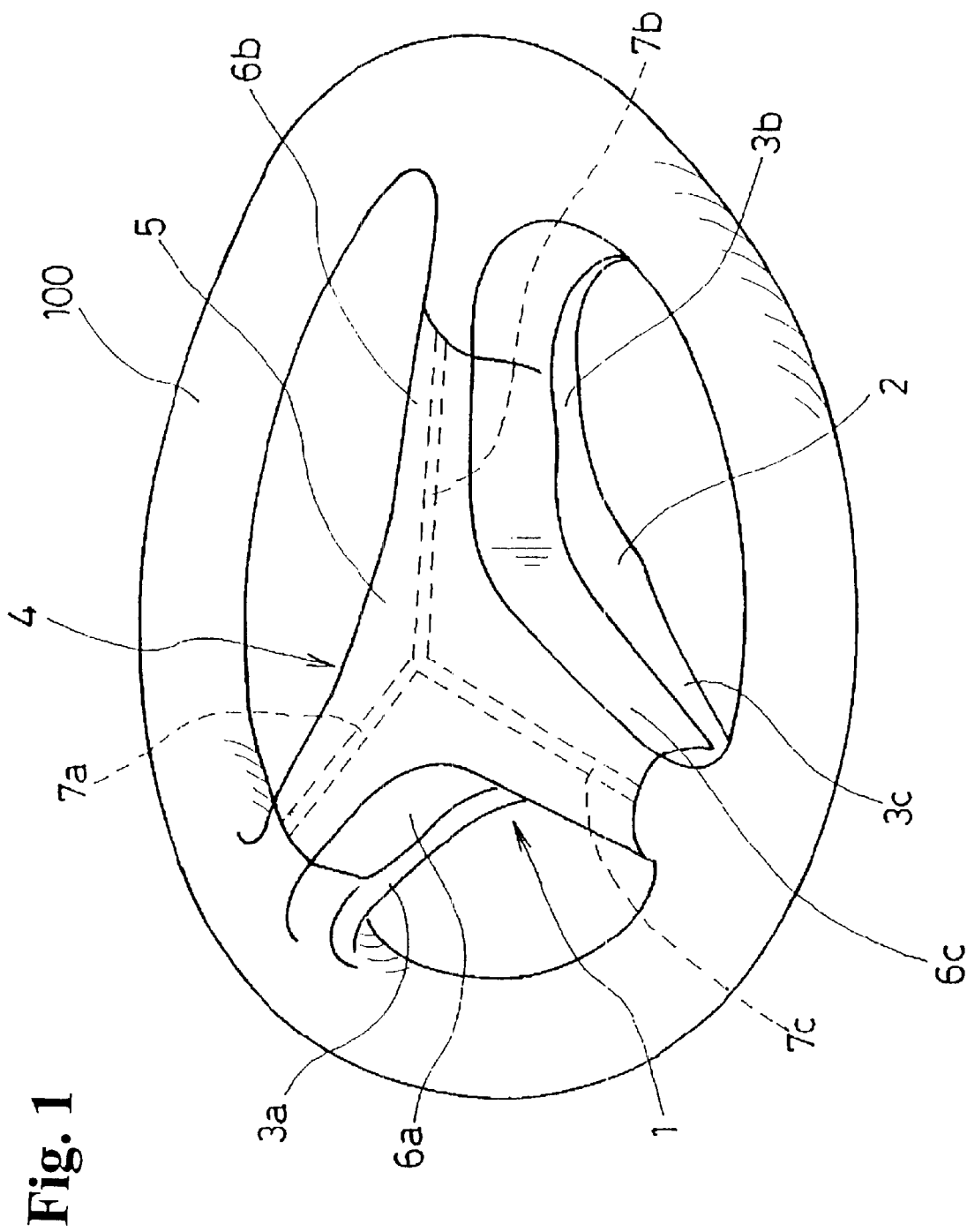
FIG. 1 is a perspective view of a steering comprising an air bag apparatus for a driver's seat according to an embodiment of the present invention.

Referring now to the drawings, embodiments of the present invention are illustrated. FIG. 1 is a perspective view showing a steering having an air bag apparatus for a driver's seat according to an embodiment of the present invention, and FIG. 2 and FIGS. 3(A)–3(E) are explanatory drawings showing the air bag in a stored state and how to fold the air bag.

An air bag apparatus 1 for a driver's seat is connected to or combined with a steering wheel 100, and comprises a center portion 2 located at about a center of the steering wheel 100, three spoke portions 3a, 3b and 3c extending from the center portion 2 and being connected to the steering wheel 100, an air bag 10 disposed so as to extend from the center portion 2 to the respective spoke portions 3a to 3c, and a module cover 4 extending along the front surfaces of the center portion 2 and the respective spoke portions 3a to 3c. The air bag apparatus 1 for the driver's seat is also provided with, as in the above described air bag apparatus 140 for the driver's seat of the related art, a retainer to which the air bag 10 is mounted, an inflator for inflating the air bag 10, and a module cover connecting member, not shown.

The module cover 4 comprises a center portion 5, and three spoke portions 6a, 6b and 6c extending outwardly from the center portion 5. The center portion 5 and the respective spoke portions 6a to 6c are disposed so as to extend along the front side of the center portion 2 and the spoke portions 3a to 3c described above and cover the air bag 10.

The module cover 4 has three tear lines, i.e. linear weakened portions, 7a to 7c, for ripping the module cover 4 on the backside. These tear lines 7a to 7c extend from the center portion of the module cover 4 to the spoke portions 6a to 6c along the directions in which the respective spoke portions 6a to 6c of the module cover 4 extend, as shown in FIG. 1.

The module cover 4 is mounted on the side of the front surface of the air bag apparatus for the driver's seat 1 via the connecting member described above, not shown, so that when the inflator is operated to eject gas to inflate the air bag 10, the tear lines 7a to 7c are torn and thus the module cover 4 is ripped from the center portion 5 to the respective spoke portions 6a to 6c and the respective portions of the module cover are opened outwardly into a tongue shape.

The air bag 10 is formed into a bag shape by disposing a fabric for the front surface (front panel) 10a and a fabric for the rear surface (rear panel) 10b together, and sewing the peripheral portions by using a sewing machine.

Figure 3A:
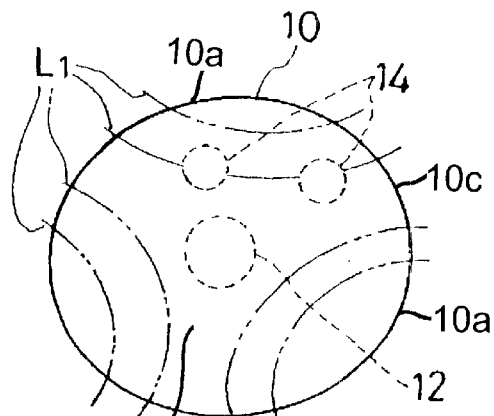
FIGS. 3(A)–3(E) are explanatory views showing a method of folding and arranging the air bag of the air bag apparatus for the driver's seat of FIG. 1.

The air bag 10 has a flat circular shape as shown in FIG. 3(A) before it is folded, and formed with an opening 12 for receiving the tip side of the inflator to the center of the rear surface (rear panel) 10b). The air bag 10 is also formed with vent holes 14 for intaking air when the air bag 10 is inflated, and for releasing air in the air bag to absorb impact when a body or driver is bumped into the inflated air bag 10.

The inflator is secured to the retainer in such a manner that the upper end thereof is accommodated in the air bag 10 through the opening (not shown) formed in the retainer. The air bag 10 is disposed to overlap the peripheral edge of the opening 12 formed on the rear surface with the peripheral portion of the opening formed in the retainer, and is secured to the retainer by being sandwiched between the peripheral portion of the opening of the retainer and an annular connecting member (not shown), as in the related art explained before. The retainer is disposed in the center portion 2.

Figure 2:
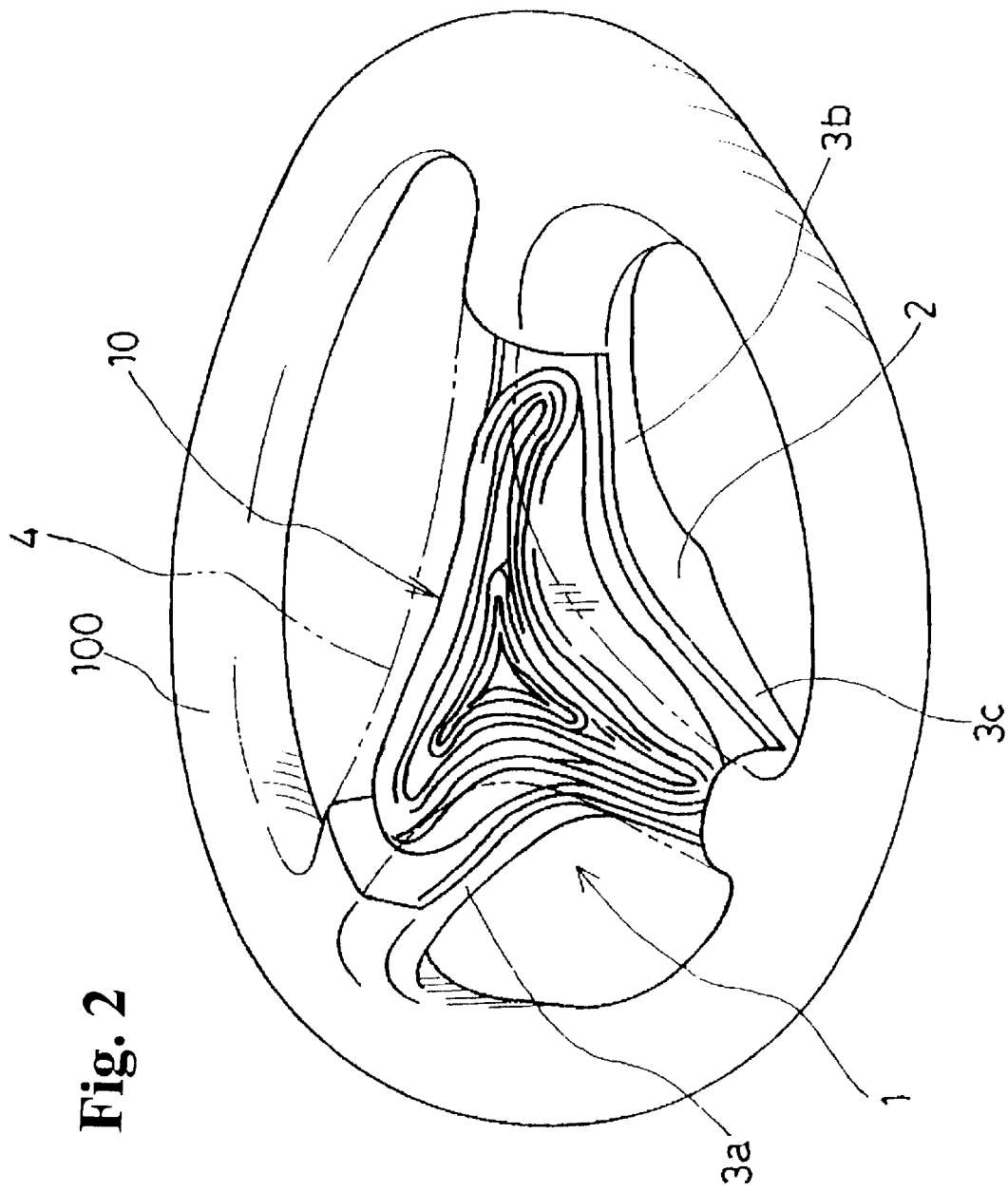
FIG. 2 is a perspective view showing an air bag of the air bag apparatus for the driver's seat of FIG. 1 in a stored state.

The air bag 10 is, as shown in FIG. 2, covered with the module cover 4 in the state that the air bag is folded in generally Y-shape extending from the center portion 2 to the respective spoke portions 3a to 3c.

Figure 3B:
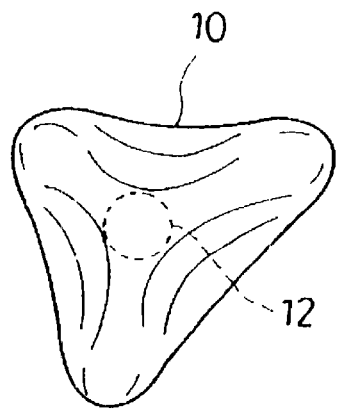
Figure 3C:
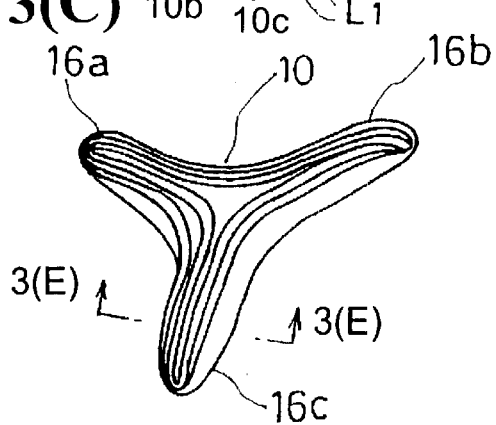
Figure 3E:
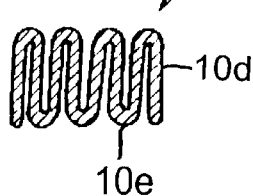
Figure 3D:
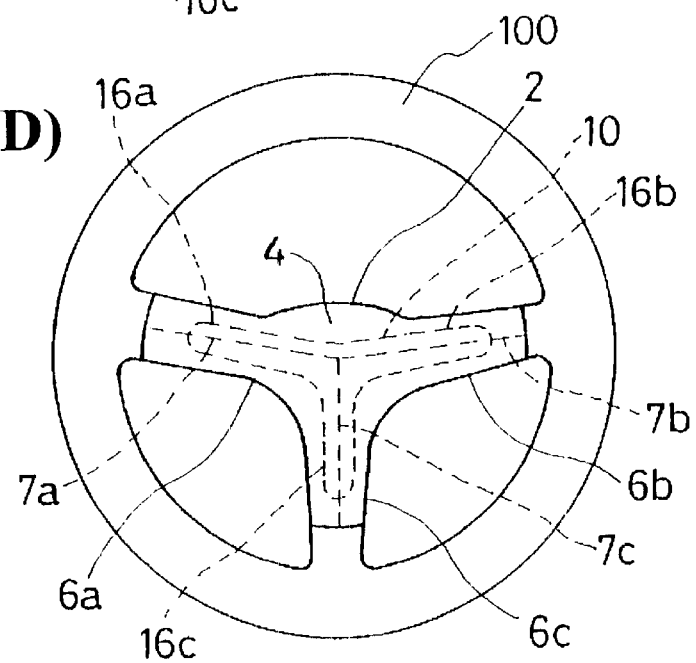

Referring now to FIGS. 3(A)–3(E), how to fold the air bag 10 is illustrated. FIGS. 3(A) to 3(C) are explanatory drawings showing how to fold the air bag 10, FIG. 3(D) is a plan view showing the arrangement of the folded body of the air bag 10, and FIG. 3(E) is a cross sectional view taken along line 3(E)–3(E) in FIG. 3(C).

To fold the air bag 10, the air bag 10 is spread out into a flat shape in a first place (FIG. 3(A)). Then, the upper edge and the lower left and right edges, i.e. side areas 10a, of the air bag 10 are respectively folded in a form of bellows along the folding lines L1 extending generally along the peripheries of the center portion 2 and the respective spoke portions 3a to 3c, and these edges are folded so as to be gathered at the center or center portion 10b of the air bag (FIG. 3(B)). As a consequent, a folded body of the air bag 10 is formed to generally have a Y-shape having three arm portions 16a, 16b and 16c extending outwardly from the center portion to lateral portions 10c (FIG. 3(C)). Each folded arm portion has laminated portions 10d and curved portions 10e.

The air bag 10 so folded is arranged so that the arm portions 16a to 16c extend along the front surfaces of the spoke portions 6a to 6c respectively. Incidentally, the air bag 10 is secured to the retainer at the center thereof prior to the folding operation. Then, the module cover 4 is placed on the air bag 10 to complete the air bag apparatus for the driver's seat 1 as shown in FIG. 1. The air bag apparatus for the driver's seat 1 is connected to the steering wheel 100 as shown in FIG. 1 and FIG. 3(D).

In the air bag apparatus for the driver's seat 1 thus constructed, when the inflator is operated to eject gas, the air bag 10 is inflated and thus presses the module cover 4 to allow the tear lines 7a to 7c to tear, so that the module cover 4 is ripped from the center portion 5 to the respective spoke portions 6a to 6c, and then opens the module cover 4 outwardly. Thereafter, the air bag 10 is rapidly inflated toward the compartment of the vehicle and receives the driver to absorb the impact.

In the air bag apparatus for the driver's seat 1, the air bag 10 is folded into a generally Y-shape corresponding to the center portion 2 and three spoke portions 3a to 3c, and the folded body of the air bag 10 is arranged so as to extend from the center potion 2 to the respective spoke portions 3a to 3c. Thus, the center portion 2 may be downsized to a relatively small configuration. As a result, the steering wheel with a slim design having a small center portion and elongated spoke portions is formed.

Since the tear lines 7a to 7c are formed to extend from the center portion 15 to the three spoke portions 16a to 16c of the module cover 4 on the backside of the module cover 4, the module cover 4 can be torn from the center portion 15 to the respective spoke portions 16a to 16c. Also, the air bag 10 can be rapidly inflated toward the compartment of the vehicle without being interfered by the module cover so as to extend from the center portion 2 to the spoke portions 3a to 3c.

Though the air bag apparatus for the driver's seat 1 comprises three spoke portions 3a to 3c, it is not limited thereto, and the number of the spoke portion may be two or four, or more. The tear line may be any type as far as it extends from the center portion to the respective spoke portions of the module cover within the range that does not interfere the inflation of the air bag.

Referring now to FIGS. 4(A)–4(E) and FIGS. 5(A)–5(E), the air bag apparatus for the driver's seat according to another embodiment of the present invention is illustrated in detail.

Figure 4A:
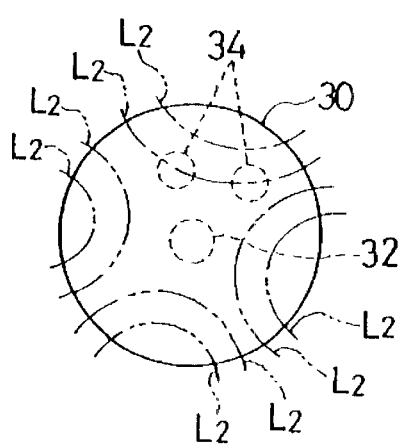
FIGS. 4(A)–4(E) are explanatory drawings showing an air bag apparatus for a driver's seat according to another embodiment of the present invention.
Figure 4B:
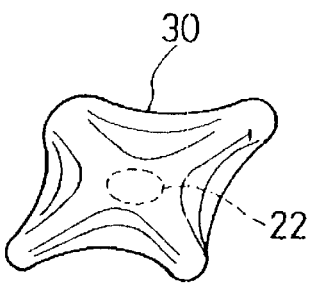
Figure 4C:
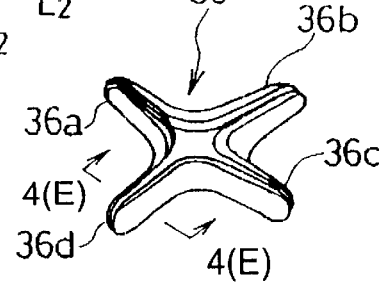
Figure 4D:
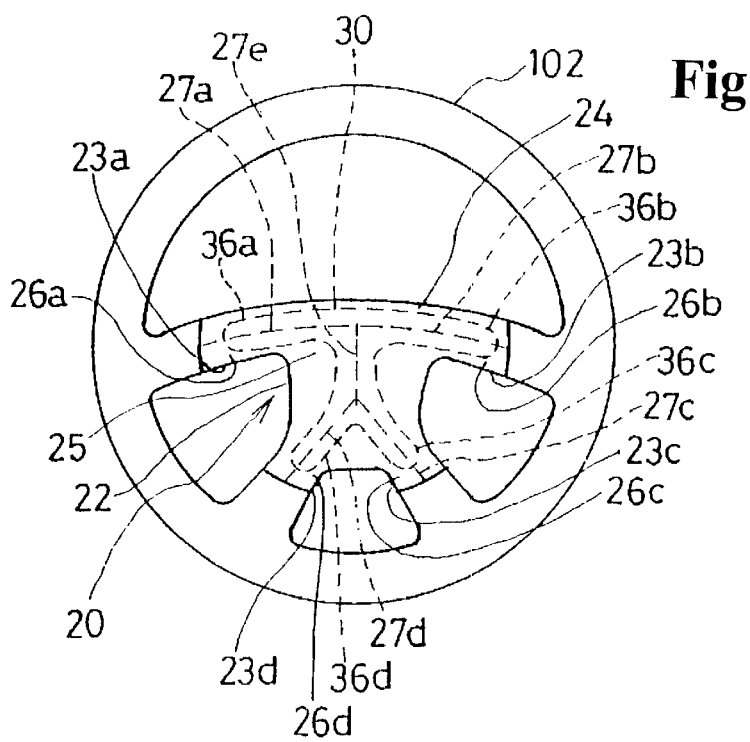
Figure 4E:
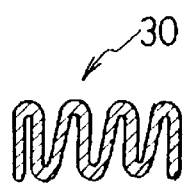

FIGS. 4(A)–4(E) are explanatory drawings showing the air bag apparatus for the driver's seat according to another embodiment of the present invention, in which FIGS. 4(A) to 4(C) are explanatory drawings showing how to fold the air bag of the air bag apparatus for the driver's seat, FIG. 4(D) is an explanatory drawing showing the structure of the air bag apparatus for the driver's seat, and FIG. 4(E) is a cross sectional view taken along line 4(E)–4(E) in FIG. 4(C).

An air bag apparatus for a driver's seat 20 is connected to or combined with a steering wheel 102 and comprises a center portion 22 located generally at the center of the steering wheel 102, four spoke portions 23a, 23b, 23c and 23d extending from the center portion 22 and connected to the steering wheel 102, an air bag 30 arranged from the center portion 22 to the spoke portions 23a to 23d, and a module cover 24 for covering the air bag 30 and extending along the front surface of the center portion 22 and the spoke portions 23a to 23d. The air bag apparatus for the driver's seat 20 includes, as in the air bag apparatus for a driver's seat 1 described above, a retainer to which the air bag 30 is mounted, an inflator for inflating the air bag 30, and a module cover connecting member (not shown).

The module cover 24 comprises a center portion 25 and four spoke portions 26a, 26b, 26c and 26d extending outwardly from the center portion 25. The center portion 25 and the spoke portions 26a to 26d are disposed on the side of the front face of the center portion 22 and the spoke portions 23a to 23d described above to cover the air bag 20.

The module cover 24 has tear lines 27a to 27e on the backside for ripping the module cover. The tear lines 27a to 27d extend from the center portion 25 of the module cover 24 to the respective spoke portions 26a to 26d along the directions in which the respective spoke portions extend. The tear line 27e is provided so as to connect the respective tear lines 27a to 27d at the center portion 25.

The module cover 24 is mounted to the air bag apparatus for the driver's seat 20 on the side of the front surface thereof via the connecting member described above, not shown. Thus, when the inflator is operated to eject gas to inflate the air bag 20, the respective tear lines 27a to 27e are torn, so that the module cover 24 is ripped from the center portion 25 to the respective spoke portions 26a to 26d and thus the portions of the module cover 24 can be opened outwardly in the shape of a tongue.

The air bag 30 is formed into a bag-shape by disposing a fabric for the front surface (front panel) 30a and a fabric for the rear surface (rear panel) 30b together, and sewing the peripheral portions by using a sewing machine.

The air bag 30 has a flat circular shape as shown in FIG. 4(A) before it is folded, and formed with an opening 32 for connecting the tip side of the inflator at the center of the rear surface (rear panel) 30b). The air bag 30 also has vent holes 34 for intaking air when the air bag 30 is inflated, or for releasing air in the air bag to absorb the impact when a body or driver is bumped into the inflated air bag 30.

The inflator is secured to the retainer in such a manner that the upper end thereof is accommodated in the air bag 30 through the opening (not shown) formed in the retainer. The air bag 30 is disposed to overlap the peripheral edge of the opening 32 with the peripheral portion of the opening formed in the retainer, and is secured to the retainer by being sandwiched between the peripheral portion of the opening of the retainer and the annular connecting member (not shown). The retainer is mounted in the center portion 22.

The air bag 30 is, as shown in FIG. 4(D), covered with the module cover 24 in the state that the air bag is folded in a generally X-shape extending from the center portion 22 to the respective spoke portions 23a to 23d.

To fold the air bag 30, the air bag 30 is spread into a flat shape in a first place (FIG. 4(A)). Then, the upper, lower, left and right edges of the air bag 30 are respectively folded in a form of bellows along the folding lines L2 extending generally along the peripheries of the center portion 22 and the respective spoke portions 23a to 23d, and these edges are folded so as to be located toward the center of the air bag (FIG. 4(B)). As a consequent, a folded body of the air bag 30 in a generally X-shape having four arm portions 36a, 36b, 36c and 36d extending outwardly from the center is formed (FIG. 4(C)).

The air bag 30 so folded is arranged so that the arm portions 36a to 36d extend along the front surfaces of the spoke portions 26a to 26d, respectively. Incidentally, the air bag 30 is secured to the retainer at the center thereof prior to the folding operation. Then, the module cover 24 is covered on the air bag 30 to complete the air bag apparatus for the driver's seat 20. The air bag apparatus for a driver's seat 20 is connected to the steering wheel 102 as shown in FIG. 4(D).

In the air bag apparatus for the driver's seat 20 thus constructed, when the inflator is operated to eject gas, the air bag 30 is inflated and thus presses the module cover 24 to allow the tear lines 27a to 27d to tear, so that the module cover 24 is ripped from the center portion 25 to the spoke portions 26a to 26d, and then opens outwardly. Thereafter, the air bag 30 is rapidly inflated toward the compartment of the vehicle and receives the driver to absorb the impact.

In the air bag apparatus for the driver's seat 20, the air bag 30 is folded into a generally X-shape corresponding to the center portion 22 and four spoke portions 23a to 23d, and the folded body of the air bag 30 is arranged so as to extend from the center potion 22 to the respective spoke portions 23a to 23d, and the module cover 24 is extended from the center portion 22 to the respective spoke portions 23a to 23d so as to cover the air bag 30.

Therefore, the center portion 22 may be downsized to a relatively small configuration as in the air bag apparatus for the driver's seat 1 described above. As a result, also, in the air bag apparatus for the driver's seat 20, the steering with a slim design having a small center portion and elongated spoke portions is formed.

Since the tear lines 27a to 27e are formed to extend from the center portion 25 to the four spoke portions 26a to 26d of the module cover 24 on the backside of the module cover 24, the module cover 24 can be torn from the center portion 25 to the respective spoke portions 26a to 26d, and the air bag 30 extending from the center portion 22 to the spoke portions 23a to 23d can be rapidly inflated toward the compartment of the vehicle without being interfered as in the air bag apparatus for the driver's seat 1.

FIGS. 5(A)–5(E) are explanatory drawings showing an air bag apparatus for a driver's seat according to another embodiment of the present invention, in which FIGS. 5(A) to 5(C) are explanatory drawings showing how to fold the air bag for the air bag apparatus for the driver's seat, FIG. 5(D) is an explanatory drawing showing the structure of the air bag apparatus for the driver's seat, and FIG. 5(E) is a cross sectional view taken along line 5(E)—5(E) in FIG. 5(C).

An air bag apparatus for a driver's seat 40 is connected to or combined with a steering wheel 104 and comprises a center portion 42 located generally at the center of the steering wheel 104, two spoke portions 43a and 43b extending from the center portion 42 and connected to the steering wheel 104, an air bag 50 arranged so as to extend from the center portion 42 to the spoke portions 43a and 43b, and a module cover 44 for covering the air bag 50 and extending along the front surface of the center portion 42 and the respective spoke portions 43a and 43b. The air bag apparatus for the driver's seat 50 includes, as in the air bag apparatuses for the driver's seat 1 and 20 described above, a retainer to which the air bag 50 is mounted, an inflator for inflating the air bag 50, and a module cover connecting member, not shown.

The module cover 44 comprises a center portion 45 and two spoke portions 46a and 46b extending outwardly from the center portion 45. The center portion 45 and the spoke portions 46a and 46b are disposed on the side of the front face of the center portion 42 and the spoke portions 43a and 43b described above to cover the air bag 50.

The module cover 44 has tear lines (linear weakened portions) 47 on the backside for ripping the module cover 44. The tear lines 47 extend from the center portion 45 of the module cover 44 to the respective spoke portions 46a and 46b of the module cover 44 along the directions in which the respective spoke portions 46a and 46b extend, as shown in FIG. 5(D).

The module cover 44 is mounted on the air bag apparatus for the driver's seat 40 on the side of the front surface thereof via the connecting member described above, not shown, so that when the inflator is operated to eject gas to inflate the air bag 50, the respective tear lines 47 are torn. Thus, the module cover 44 is ripped from the center portion 45 to the respective spoke portions 46a and 46b, and thus the portions of the module cover 44 can be opened outwardly in the shape of a tongue.

The air bag 50 is formed into a bag-shape by placing a fabric for the front surface (front panel) 50a and a fabric for the rear surface (rear panel) 50b together, and sewing the peripheral portions by using a sewing machine.

The air bag 50 has a flat circular shape as shown in FIG. 5(A) before it is folded, and has an opening 52 for connecting the tip side of the inflator to the center of the rear surface (rear panel 50b). The air bag 50 also has vent holes 54 for intaking air when the air bag 50 is inflated, or for releasing air in the air bag to absorb the impact when the body or driver is bumped into the inflated air bag 50.

The inflator is secured to the retainer in such a manner that the upper end thereof is accommodated in the air bag 50 through the opening (not shown) formed in the retainer. The air bag 50 is disposed to overlap the peripheral edge of the opening 52 formed in the rear surface with the peripheral portion of the opening formed in the retainer, and is secured to the retainer by being sandwiched between the peripheral portion of the opening of the retainer and the annular connecting member (not shown). The retainer is disposed in the center portion 42.

The air bag 50 is, as shown in FIG. 5(D), covered with the module cover 44 in the state that the air bag is folded in a generally elongated linear configuration extending from the center portion 42 to the spoke portions 43a and 43b.

To fold the air bag 50, the air bag 50 is spread out into a flat shape in a first place (FIG. 5(A)). Then, the upper and lower edges of the air bag 50 are respectively folded in a form of bellows along the folding lines L3 extending generally along the peripheries of the center portion and the respective spoke portions 43a and 43b (FIG. 5(B)). As a consequent, a folded body of the air bag 50 is formed in a generally elongated linear configuration having two arm portions 56a and 56b extending outwardly from the center (FIG. 5(C)).

The air bag 50 so folded is arranged so that the arm portions 56*a* and 56*b* extend along the front surface of the spoke portions 43*a* and 43*b*, respectively. Incidentally, the air bag 50 is secured to the retainer at the center thereof prior to the folding operation. Then, the module cover 44 is placed on the air bag 50 to complete the air bag apparatus for the driver's seat 40 shown in FIG. 5(D). The air bag apparatus for the driver's seat 40 is connected to the steering wheel 104 as shown in FIG. 5(D).

In the air bag apparatus for the driver's seat 40, when the inflator is operated to eject gas, the air bag 50 is inflated and thus presses the module cover 44 to allow the tear lines 47 to tear, so that the module cover 44 is ripped from the center portion 45 to the respective spoke portions 46*a* and 46*b* to open outwardly. Thereafter, the air bag 50 is rapidly inflated toward the compartment of the vehicle and receives the driver to absorb the impact.

In the air bag apparatus for the driver's seat 40, the air bag 50 is folded into a generally elongated linear configuration corresponding to the center portion 42 and two spoke portions 43*a* and 43*b*, and the folded body of the air bag 50 is arranged so as to extend from the center potion 42 to the respective spoke portions 43*a* and 43*b*, and the module cover 44 is extended from the center portion 42 to the respective spoke portions 43*a* and 43*b* so as to cover the air bag 50. Thus, the center portion 42 may be downsized to a relatively small configuration as in the air bag apparatus for the driver's seat 1, and the air bag apparatus for the driver's seat 20 described above. As a result, also, in the air bag apparatus for the driver's seat 40, the steering with a slim design having the small center portion and elongated spoke portions are obtained.

Since the tear lines 47 are formed to extend from the center portion 45 to the two spoke portions 46*a* and 46*b* of the module cover 44 on the backside of the module cover 44, the module cover 44 can be easily torn from the center portion 45 to the respective spoke portions 46*a* and 46*b*, without interfering the inflation of the air bag 50 so as to extend from the center portion 42 to the spoke portions 43*a* and 43*b*. The air bag 50 can be rapidly inflated toward the compartment of the vehicle.

Figure 6:
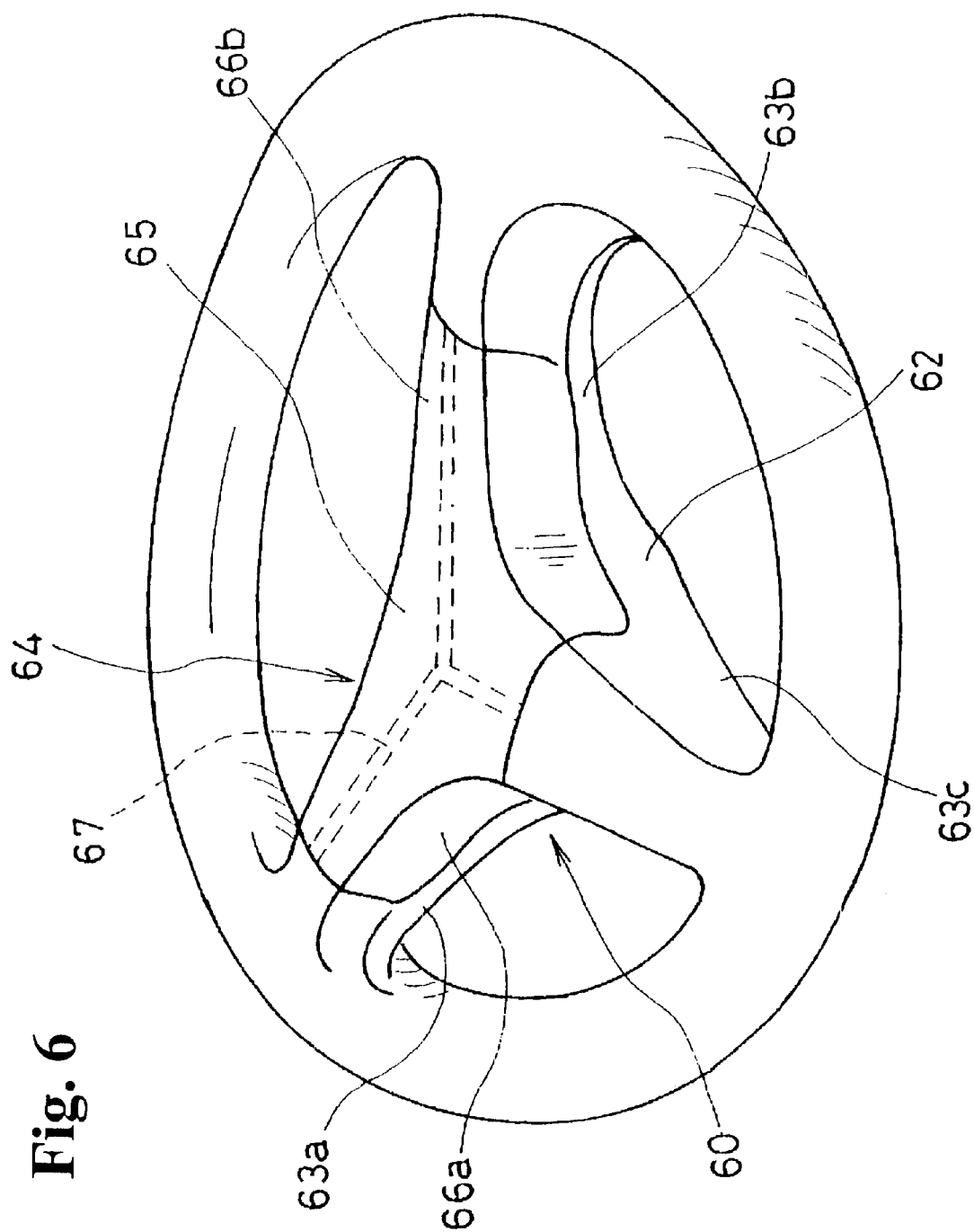
FIG. 6 is a perspective view showing a different embodiment of the air bag apparatus for the driver's seat of FIGS. 5(A)–5(E)
Figure 7:
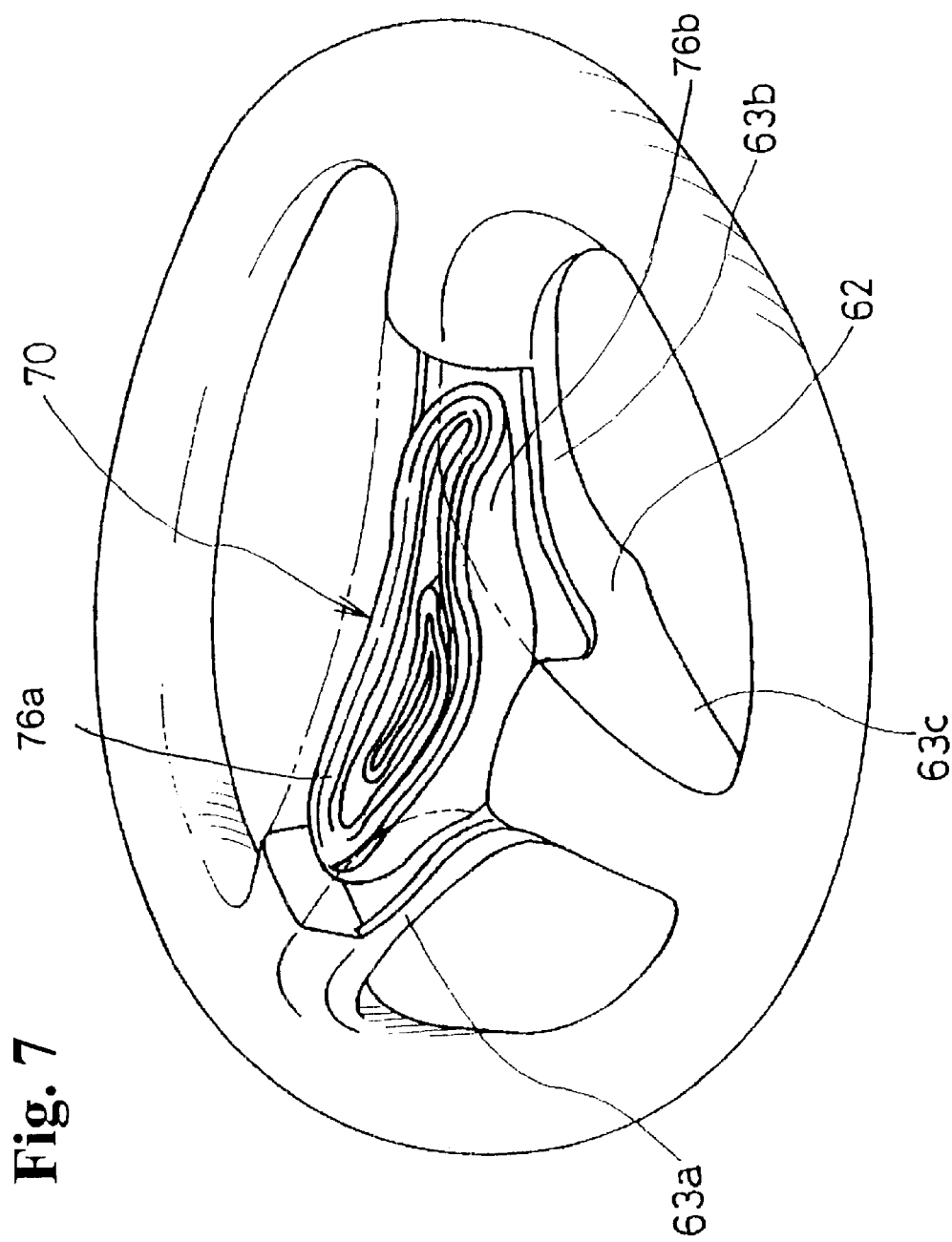
FIG. 7 is a perspective view showing the air bag of the air bag apparatus for the driver's seat of FIG. 6 in the stored state.

In the air bag apparatus for the driver's seat having the air bag folded into a generally elongated linear configuration, the air bag apparatus for the driver's seat may have three or more spoke portions. For example, as shown in FIGS. 6 and 7, an air bag apparatus for a driver's seat 60 has three spoke portions 63*a*, 63*b*, and 63*c* extending from a center portion 62.

An air bag 70 is folded into a generally elongated linear configuration and secured to the center portion 62 via a retainer (not shown). Arm portions 76*a* and 76*b* of the folded body of the air bag 70 are arranged so as to extend respectively along the spoke portions 63*a* and 63*b* extending toward the opposite directions on the left and right.

The air bag 70 is covered with a module cover 64 arranged so as to extend from the center portion 62 to the respective spoke portions 63*a* and 63*b* on the front side thereof. The module cover 64 has tear lines 67 on the backside, extending from the center portion 65 to the respective spoke portions 63*a* and 63*b* of the module cover 64.

In the air bag apparatus for the driver's seat 60, when the inflator is operated to eject gas to inflate the air bag 70, the tear lines 76 are torn to rip the module cover 64 from the center portion 65 to the respective spoke portions 63*a* and 63*b*, and the respective parts of the modular cover 64 open outwardly in the shape of a tongue. Thus, the air bag 70 is rapidly inflated toward the compartment of the vehicle without being interfered with its inflation to receive the driver and absorb the impact.

In this way, since the air bag 70 folded into a generally elongated linear configuration is arranged so as to extend from the center portion 62 of the air bag apparatus for the driver's seat 60 to a pair of spoke portions 63*a* and 63*b* extending away from each other, it does not limit the structure of any other spoke portions. As a result, in case the air bag folded into a generally elongated linear configuration is mounted to the air bag apparatus for the driver's seat, design of the steering, such as the number of the spoke portions or the construction thereof, can be freely selected.

In the embodiment described above, although the air bag is folded in a form of bellows along the folding lines L extending generally along the peripheries of the center portion of the air bag apparatus for the driver's seat and the respective spoke portions so as to extend from the center portion of the air bag apparatus for the driver's seat to the respective spoke portions, the method of folding the air bag is not limited thereto, and it may be folded in other ways. The other ways of folding the air bag are described with specific examples.

Figure 8A:
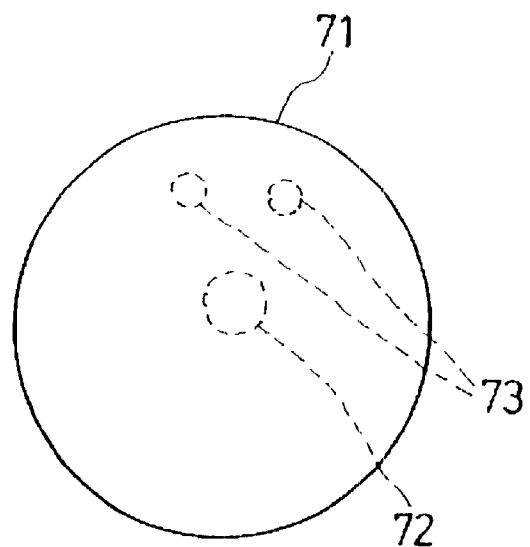
FIGS. 8(A)–8(D) are explanatory drawings showing a first embodiment of a second method of folding the air bag.
Figure 8B:
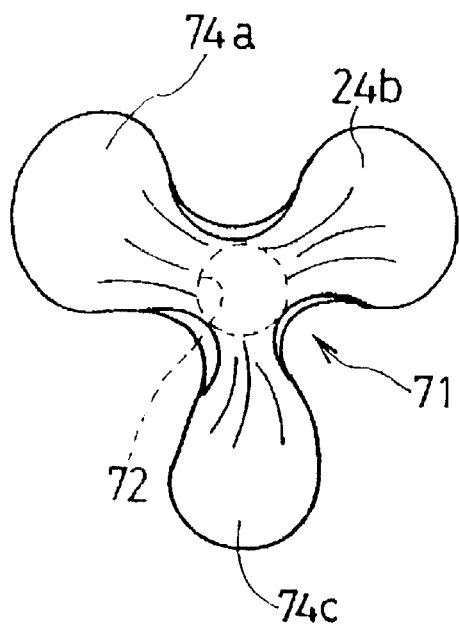
Figure 8C:
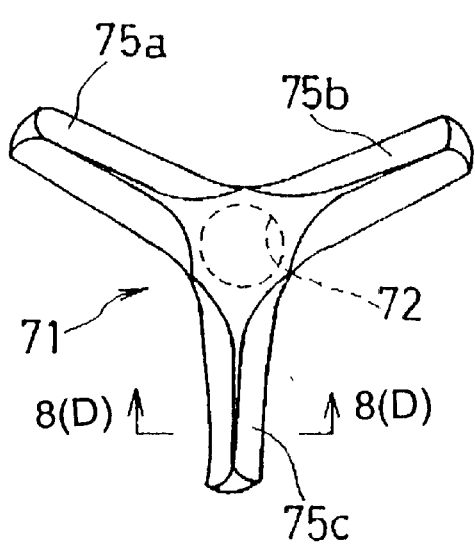
Figure 8D:
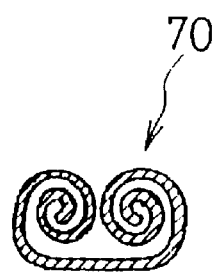

FIGS. 8(A) to 8(C) are explanatory drawings showing the second way of folding the air bag into a generally Y-shaped configuration, and FIG. 8(D) is a cross sectional view taken along line 8(D)—8(D) of FIG. 8(C).

An air bag 71 has the same construction as the air bag of the embodiment described above and has an opening 72 and vent holes 73 on the backside thereof. The air bag 71 is mounted on the air bag apparatus for the driver's seat (not shown) having three spoke portions, as in the case shown in FIG. 1.

To fold the air bag 71, in a first place, the upper edge and the lower left and right edges of the air bag 71 are pushed toward the center of the air bag 71 to form three petal-shaped portions 74*a*, 74*b* and 74*c* radially extending along the directions of the spoke portions (not shown) of the air bag apparatus for the driver's seat to accommodate the air bag 71 (FIG. 8(B)). Then, both radially extending edges of the respective petal-shaped portions 74*a* to 74*c* are rolled up toward the center of the respective petal-shaped portions into three arm portions 75*a*, 75*b* and 75*c* to form a generally Y-shaped folded body of the air bag 71 (FIG. 8(C)).

Though it is not shown, the air bag 71 is secured to a retainer at the peripheral edge of the opening 72 as in the embodiments described above. The center portion of the folded body of the air bag 71 is disposed at the center of the air bag apparatus for the driver's seat in such a manner that the respective arm portions 75*a* to 75*c* extend from the center portion to the respective spoke portions along the directions in which the respective spoke portions extend. Then, the module cover is mounted to cover the air bag 71 to complete the air bag apparatus for the driver's seat. Other construction and operation of the air bag apparatus for the driver's seat are the same as the air bag apparatus for the driver's seat 1 shown in FIG. 1 to FIG. 3(E).

Figure 9A:
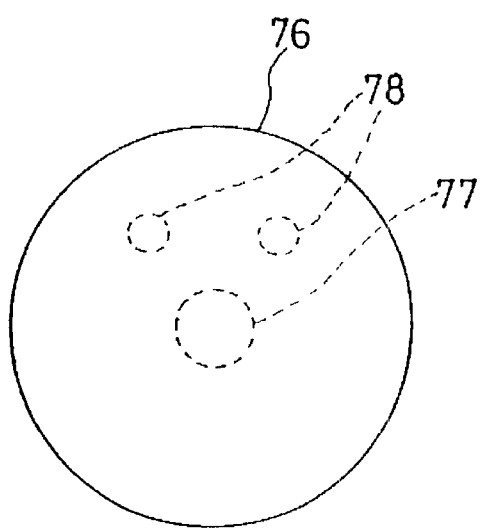
FIGS. 9(A)–9(D) are explanatory drawings showing a second embodiment of the second method of folding the air bag.
Figure 9B:
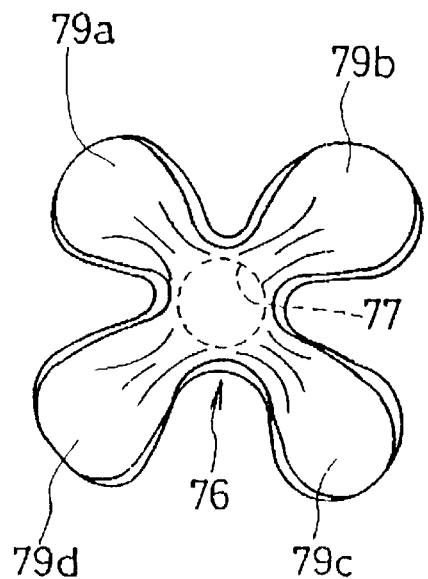
Figure 9C:
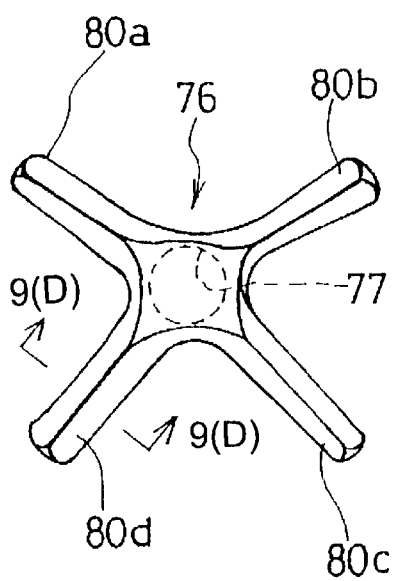
Figure 9D:
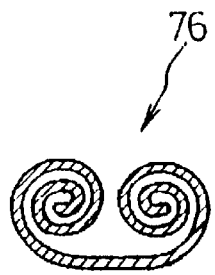
Figure 10A:
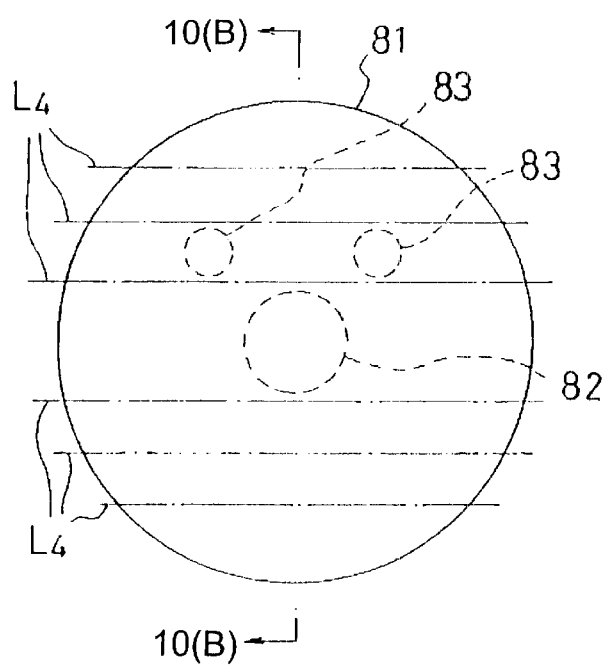
FIGS. 10(A) and 10(B) are explanatory drawings showing a third embodiment of the second method of folding the air bag.
Figure 10B:
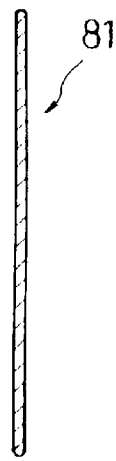

FIGS. 9(A) to 9(C) are explanatory drawings showing the second way of folding the air bag into a generally X-shaped configuration, and FIG. 9(D) is a cross sectional view of taken along line 9(D)—9(D) in FIG. 9(C).

An air bag 76 has the same construction as the air bag of the embodiment described above and has an opening 77 and vent holes 78 on the backside thereof. The air bag 76 is mounted to the air bag apparatus for the driver's seat (not shown) having four spoke portions, as in the case shown in FIG. 4(D).

To fold the air bag 76, in a first place, the upper, lower, left and right edges of the air bag 76 are pushed toward the center of the air bag 76 to form four petal-shaped portions 79a, 79b, 79c and 70d radially extending along the directions of the spoke portions (not shown) of the air bag apparatus for the driver's seat to accommodate the air bag 76 (FIG. 9(B)). Then, both radially extending edges of the respective petal-shaped portions 79a to 79d are rolled up toward the center of the respective petal-shaped portions on the front side of the air bag 76 into four arm portions 80a, 80b, 80c and 80d to form a generally X-shaped folded body of the air bag 76 (FIG. 9(C)).

Though it is not shown, the air bag 76 is secured to a retainer at the peripheral edge of the opening 77 as in the embodiments described above. The center portion of the folded body of the air bag 76 is disposed at the center of the air bag apparatus for the driver's seat in such a manner that the respective arm portions 80a to 80d extend from the center portion to the respective spoke portions. Then, the module cover is mounted to cover the air bag 76 to complete the air bag apparatus for the driver's seat. Other construction and operation of the air bag apparatus for the driver's seat are the same as those of the air bag apparatus for the driver's seat 20 shown in FIG. 4(D).

FIGS. 10(A) to 13(B) are explanatory drawings showing the second way of folding the air bag into a generally elongated linear configuration. In these figure, FIGS. 10(A), 11(A), 12(A) and 13(A) are plan views of the air bag, and FIGS. 10(B), 11(B), 12(B) and 13(B) are cross sectional views taken along respective lines 10(B)—10(B), 11(B)—11(B), 12(B)—12(B) and 13(B)—13(B).

An air bag 81 has the same construction as that of the embodiment described above, and has an opening 82 and vent holes 83 on the backside thereof. The air bag 81 is mounted to the air bag apparatus for the driver's seat (not shown) having two spoke portions as in the case shown in FIG. 5(D), or to the air bag apparatus for the driver's seat (not shown) having at least three spoke portions as shown in FIGS. 6 and 7.

Figure 11A:
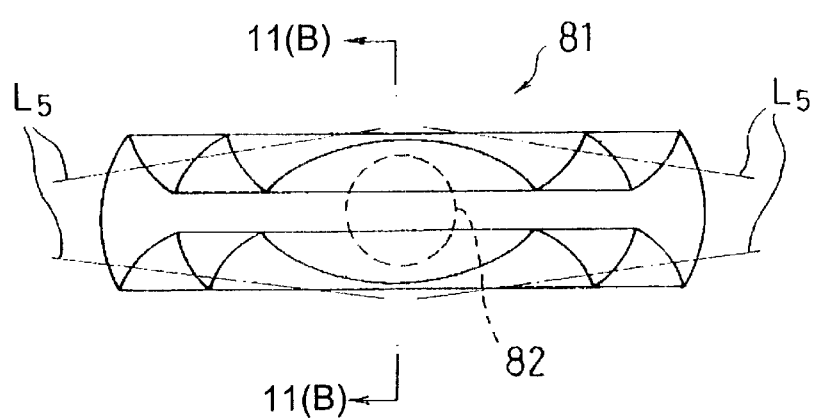
FIGS. 11(A) and 11(B) are explanatory drawings showing the third embodiment of the second method of folding the air bag.
Figure 11B:
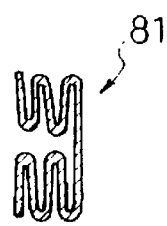
Figure 12A:
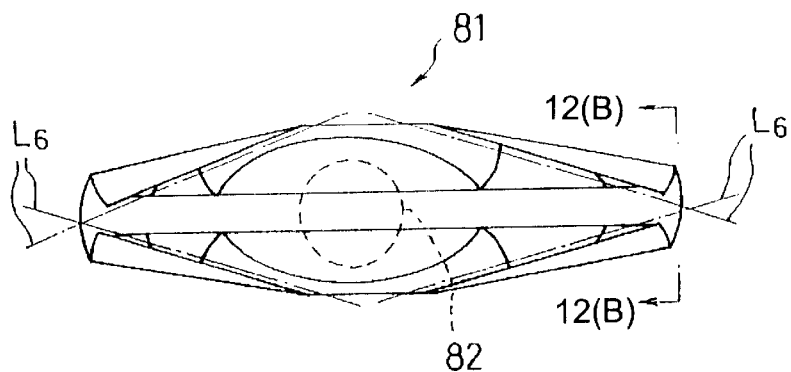
FIGS. 12(A) and 12(B) are explanatory drawings showing the third embodiment of the second method of folding the air bag.
Figure 12B:
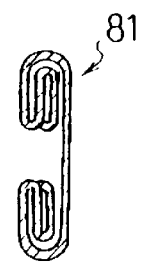
Figure 13A:
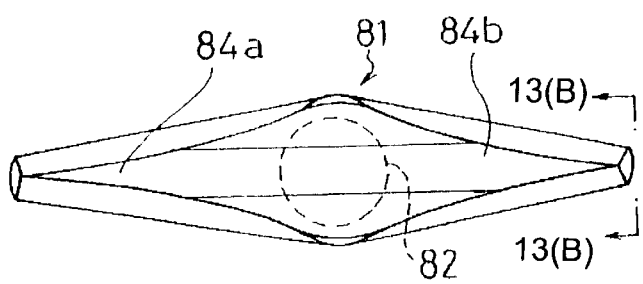
FIGS. 13(A) and 13(B) are explanatory drawings showing the third embodiment of the second method of folding the air bag.
Figure 13B:
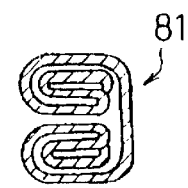

To fold the air bag 81, in a first place, as shown in FIGS. 11(A) and 11(B), the upper and lower edges of the air bag 81 are respectively folded in bellows along the folding lines L4 into an elongated rectangular shape. Then, as shown in FIGS. 12(A) and 12(B), each edge of four corners of the rectangular air bag 81 is folded toward the front surface of the air bag 81 along the folding lines L5, and again along the folding lines L6, to make an elongated generally rhombus shape of the air bag 81 having tapered arm portions 84a and 84b on both sides as shown in FIG. 13(A).

Though it is not shown, the air bag 81 is secured to a retainer at the peripheral edge of the opening 82 as in the embodiments described above. The center portion of the folded body of the air bag 81 is disposed at the center of the air bag apparatus for the driver's seat in such a manner that the respective arm portions 84a and 84b extend from the center portion to the respective spoke portions along the directions in which the respective spoke portions extend. Then, the module cover is mounted to cover the air bag 81 to complete the air bag apparatus for the driver's seat. Other construction and operation of the air bag apparatus for the driver's seat are the same as those of the air bag apparatus for the driver's seat 40 shown in FIG. 5(D) or the air bag apparatus for the driver's seat 60 shown in FIGS. 6 and 7.

Figure 14A:
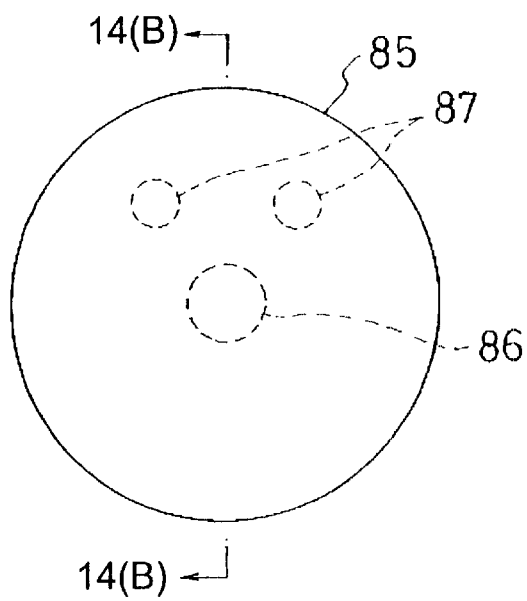
FIGS. 14(A) and 14(B) are explanatory drawings showing a third method of folding the air bag.
Figure 14B:
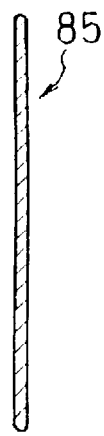
Figure 15A:
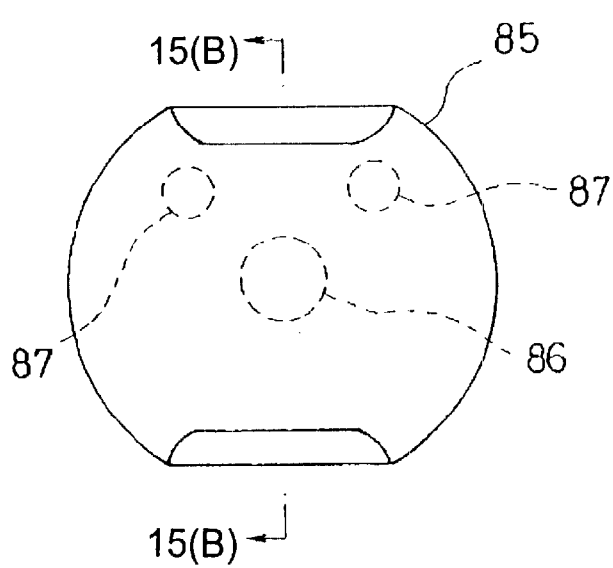
FIGS. 15(A) and 15(B) are explanatory drawings showing the third method of folding the air bag.
Figure 15B:
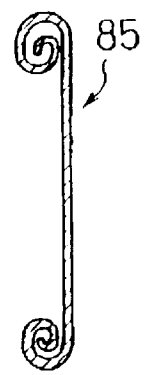
Figure 16A:
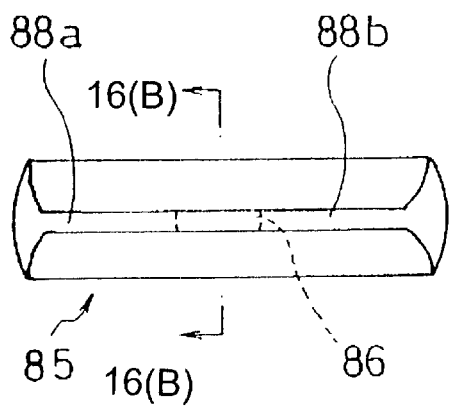
FIGS. 16(A) and 16(B) are explanatory drawings showing the third method of folding the air bag.
Figure 16B:
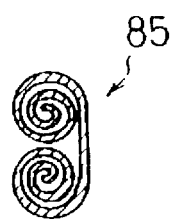

FIGS. 14(A) to 16(B) are explanatory drawings showing the third way of folding the air bag into a generally elongated linear configuration. In these figures, FIGS. 14(A), 15(A), 16(A) are plan views of the air bag, and FIGS. 14(B), 15(B), 16(B) are cross sectional views taken along respective lines 14(B)—14(B), 15(B)—15(B), 16(B)—16(B).

An air bag 85 has the same construction as those of the embodiments described above and has an opening 86 and vent holes 87 on the backside thereof. The air bag 85 is mounted to the air bag apparatus for the driver's seat (not shown) having two spoke portions as shown in FIG. 5(D), or to the air bag apparatus for the driver's seat (not shown) having at least three spoke portions as shown in FIGS. 6 and 7.

To fold the air bag 85, in a first place as shown in FIGS. 15(A) and 15(B), the upper and lower edges of the air bag 85 are respectively rolled up on the front side of the air bag 85 toward the center thereof. Then, as shown in FIGS. 16(A) and 16(B), an elongated generally rectangular folded body of the air bag 85 having the arm portions 88a and 88b on both sides is formed.

Though it is not shown, the air bag 85 is secured to a retainer at the peripheral edge of the opening 86 as in the embodiments described above. The center portion of the folded body of the air bag 85 is disposed at the center of the air bag apparatus for the driver's seat in such a manner that the respective arm portions 88a and 88b extend from the center portion to the respective spoke portions. Then, a module cover is mounted to cover the air bag 85 to complete the air bag apparatus for the driver's seat. Other construction and operation of the air bag apparatus for the driver's seat are the same as those of the air bag apparatus for the driver's seat 40 shown in FIG. 5(D) or the air bag apparatus for the driver's seat 60 shown in FIGS. 6 and 7.

Figure 17A:
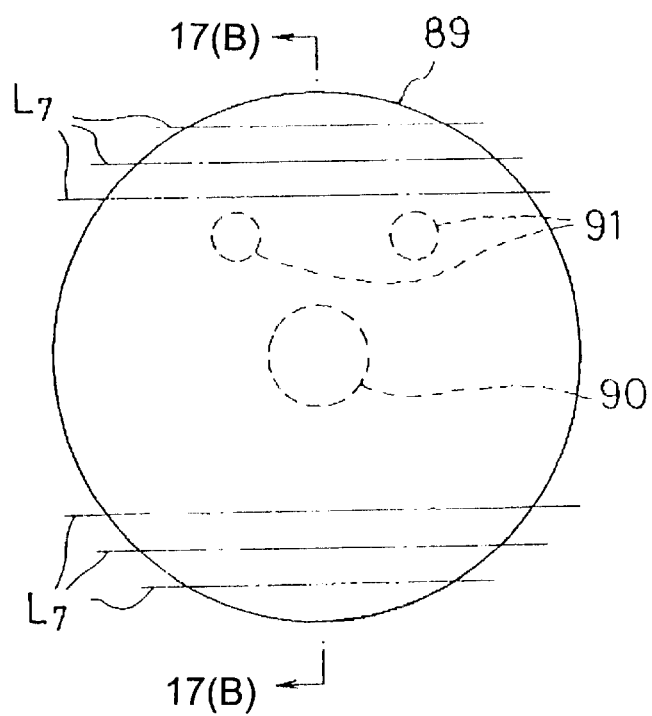
FIGS. 17(A) and 17(B) are explanatory drawings showing a fourth method of folding the air bag.
Figure 17B:
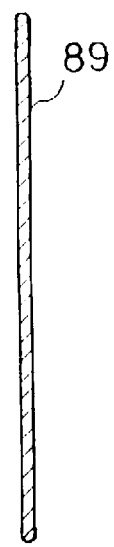
Figure 18A:
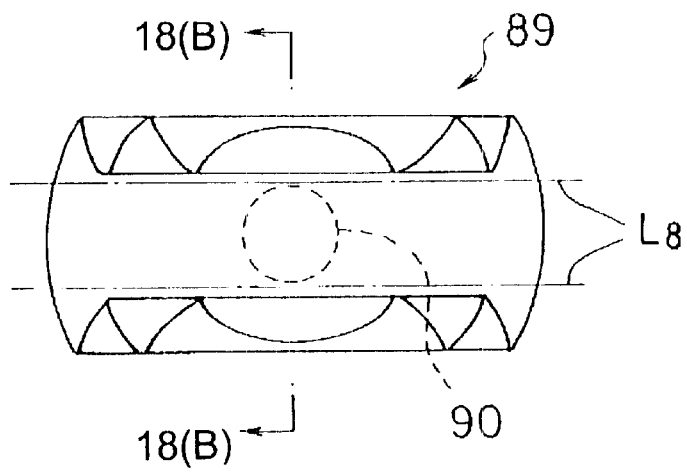
FIGS. 18(A) and 18(B) are explanatory drawings showing the fourth method of folding the air bag.
Figure 18B:
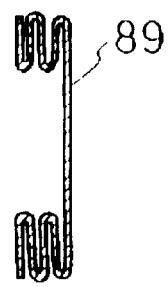
Figure 19A:
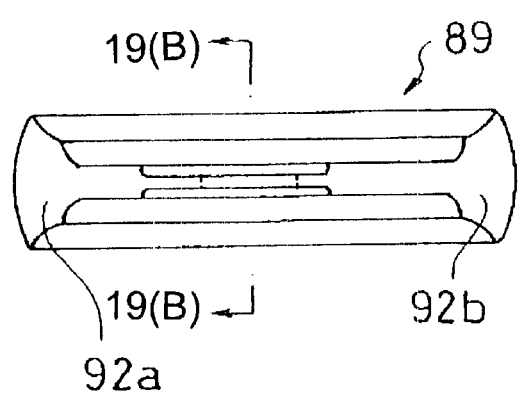
FIGS. 19(A) and 19(B) are explanatory drawings showing the fourth method of folding the air bag.
Figure 19B:
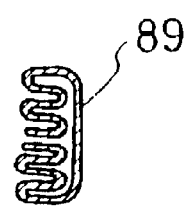

FIGS. 17(A) to 19(B) are explanatory drawings showing the fourth way of folding the air bag into a generally elongated linear configuration. In these figures, FIGS. 17(A), 18(A), 19(A) are plan views of the air bag, and FIGS. 17(B), 18(B), 19(B) are cross sectional views taken along respective lines 17(B)—17(B), 18(B)—18(B), 19(B)—19(B).

An air bag 89 has the same construction as in the embodiments described above and has an opening 90 and vent holes 91 on the backside thereof. The air bag 89 is mounted to the air bag apparatus for the driver's seat (not shown) having two spoke portions as shown in FIG. 5(D), or to the air bag apparatus for the driver's seat (not shown) having at least three spoke portions as shown in FIGS. 6 and 7.

To fold the air bag 89, in a first place, as shown in FIGS. 18(A) and 18(B), the upper and lower edges of the air bag 89 are respectively folded in bellows toward the front surface of the air bag 87 along the folding lines L7 into generally rectangular shape. Then, the upper and lower edges of the thus folded air bag 89 are folded toward the front surface of the air bag 89 along the folding lines L8. Consequently, an elongated generally rectangular folded body of the air bag 89 having arm portions 92a and 92b on both sides is formed as shown in FIGS. 19(A), 19(B).

Though it is not shown, the air bag 89 is secured to a retainer at the peripheral edge of the opening 90 as in the embodiments described above. The center portion of the folded body of the air bag 89 is disposed at the center of the air bag apparatus for the driver's seat along the directions in which the respective spoke portions extend in such a manner that the respective arm portions 92a and 92b extend from the center portion to the respective spoke portions. Then, the module cover is mounted to cover the air bag 89 to complete the air bag apparatus for the driver's seat. Other construction and operation of the air bag apparatus for the driver's seat are the same as those of the air bag apparatus for the driver's seat 40 shown in FIG. 5(D) or the air bag apparatus for the driver's seat 60 shown in FIGS. 6 and 7.

Figure 20A:
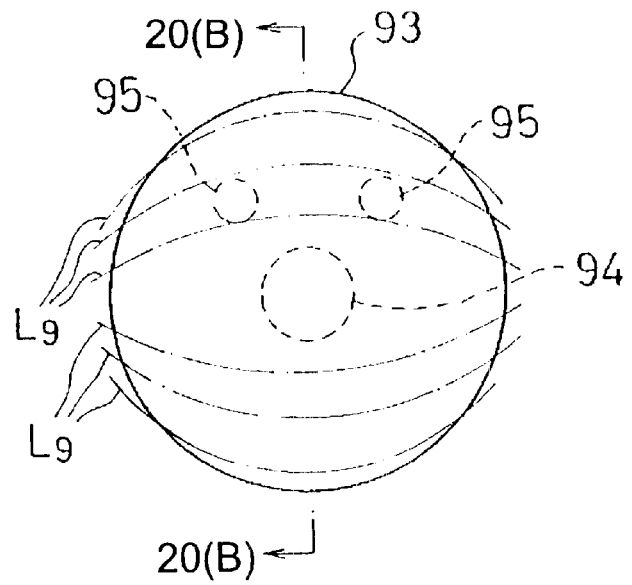
FIGS. 20(A) and 20(B) are explanatory drawings showing a fifth method of folding the air bag.
Figure 20B:
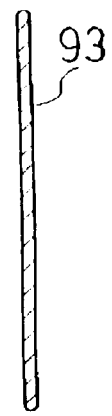
Figure 21A:
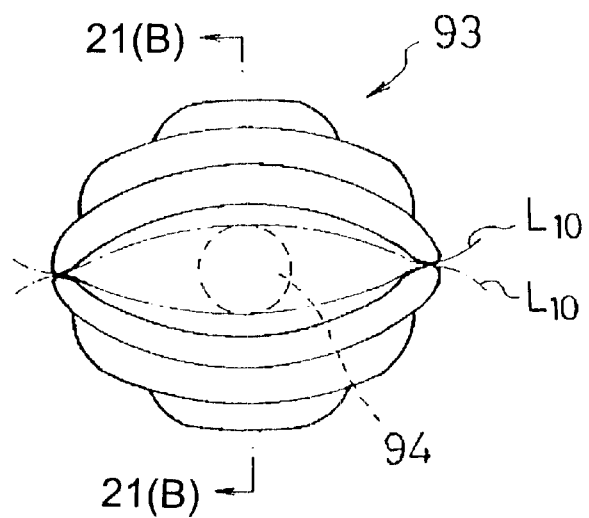
FIGS. 21(A) and 21(B) are explanatory drawings showing the fifth method of folding the air bag.
Figure 21B:
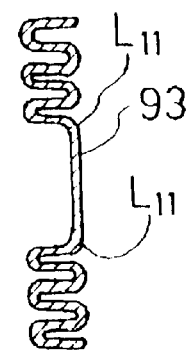
Figure 22A:
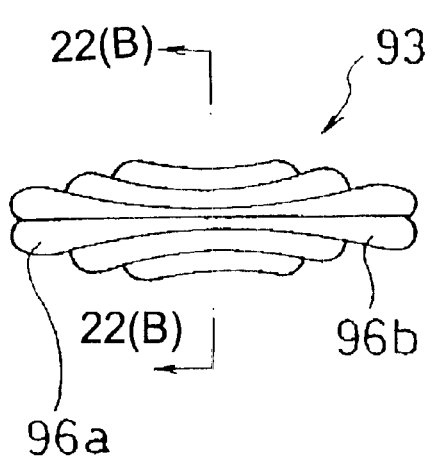
FIGS. 22(A) and 22(B) are explanatory drawings showing the fifth method of folding the air bag.
Figure 22B:
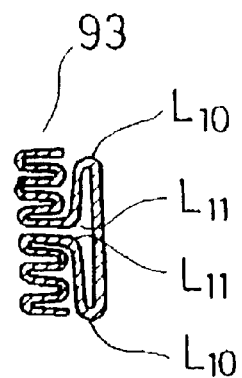
Figure 23A:
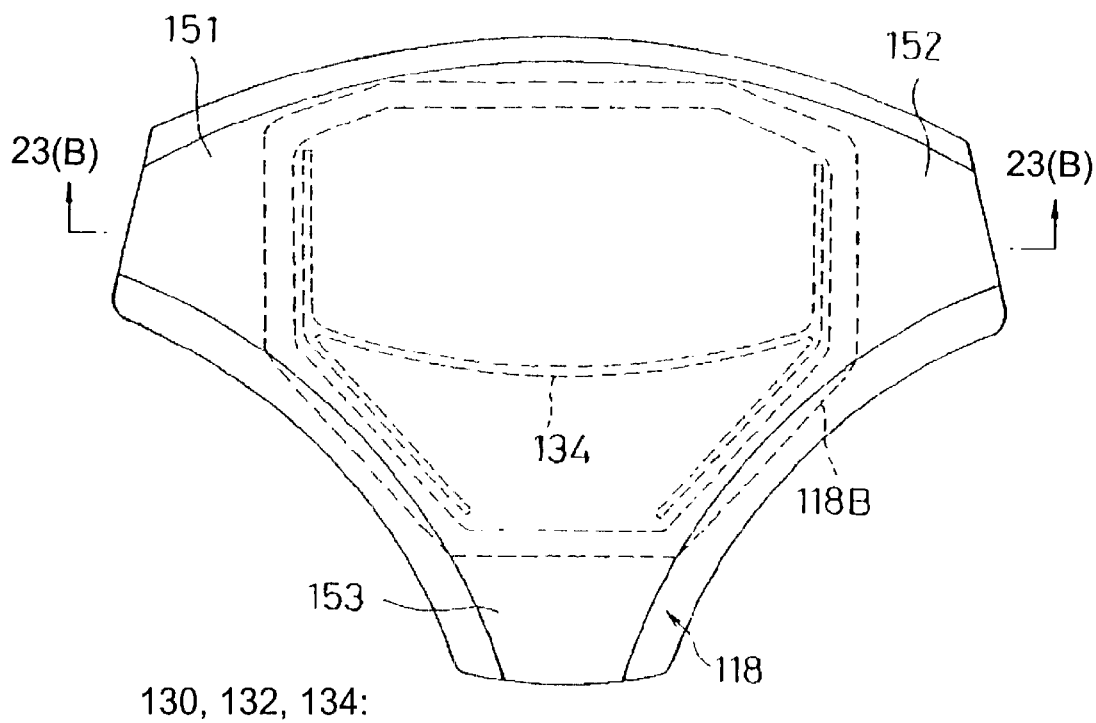
FIGS. 23(A) and 23(B) are explanatory drawings showing an air bag apparatus for a driver's seat of the related art.
Figure 23B:
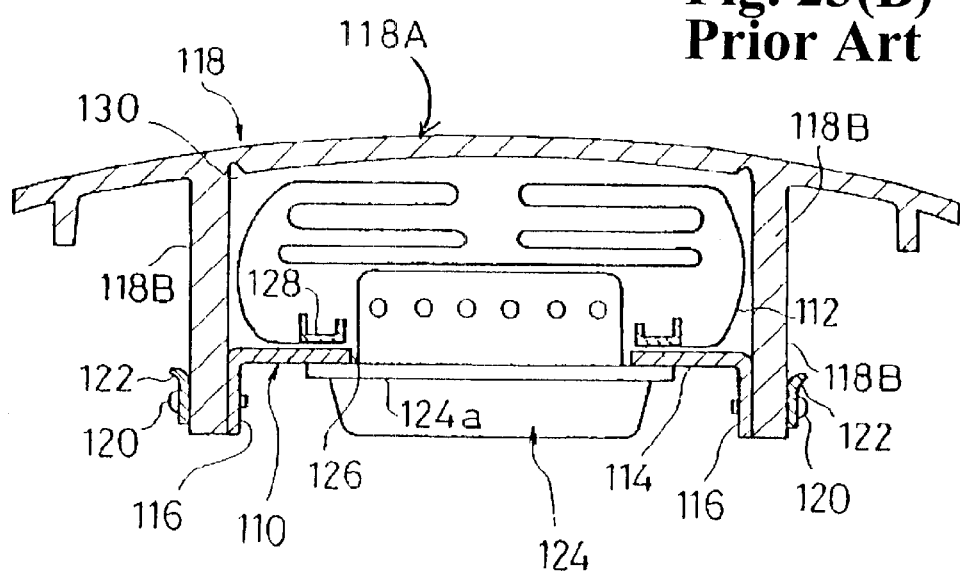
Figure 24:
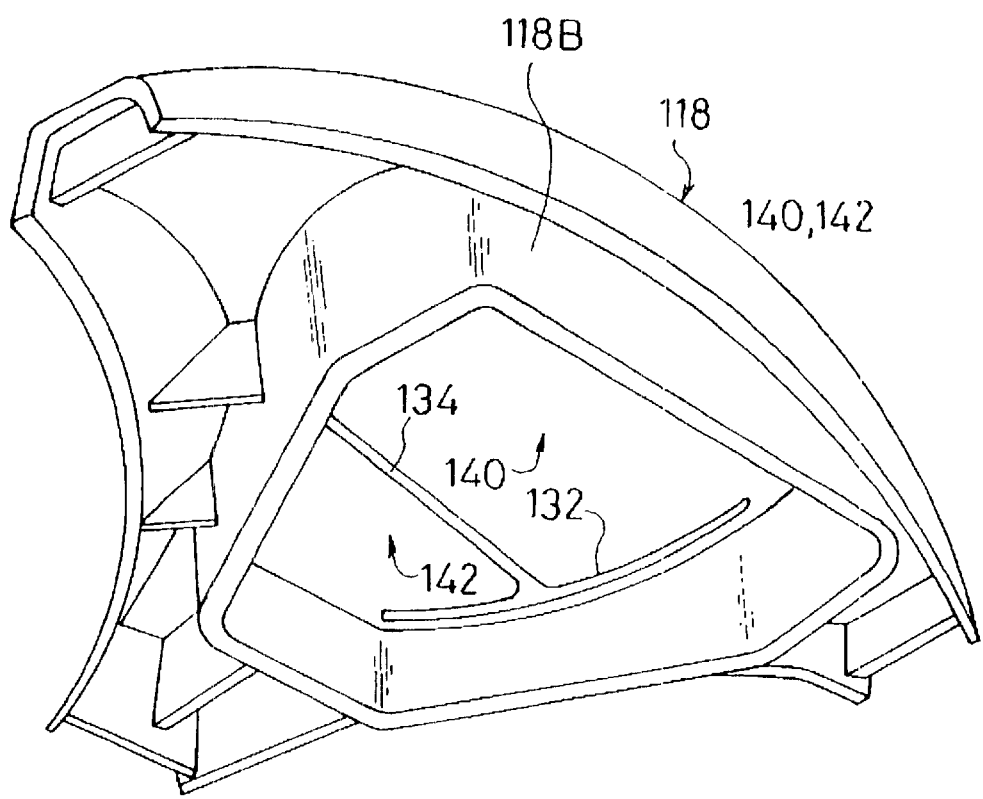
FIG. 24 is a perspective view of the module cover of the air bag apparatus for the driver's seat of FIGS. 23(A) and 23(B) viewed from the backside.
Figure 25:
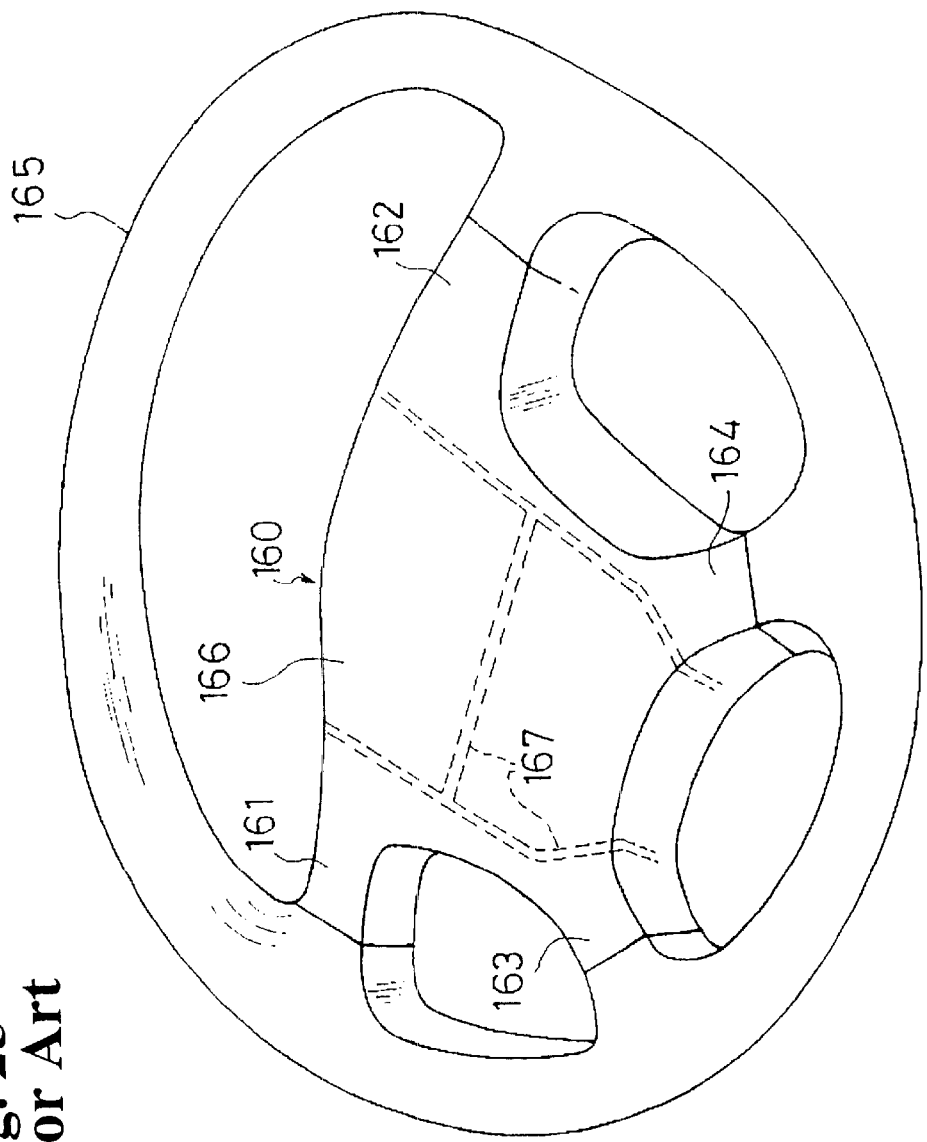
FIG. 25 is a perspective view showing an air bag apparatus for the driver's seat according to another related art.

FIGS. 20(A) to 22(B) are explanatory drawings showing the fifth way of folding the air bag into a generally elongated linear configuration. In these figures, FIGS. 20(A), 21(A), 22(A) are plan views of the air bag, and FIGS. 20(B), 21(B), 22(B) are cross sectional views taken along the respective lines 20(B)—20(B), 21(B)—21(B), 22(B)—22(B).

An air bag 93 has the same construction as that of the embodiments described above and has an opening 94 and vent holes 95 on the backside thereof. The air bag 93 is mounted to the air bag apparatus for the driver's seat (not shown) having two spoke portions as shown in FIG. 5(D), or to the air bag apparatus for the driver's seat (not shown) having at least three spoke portions as shown in FIGS. 6 and 7.

To fold the air bag 93, in a first place, as shown in FIGS. 21(A) and 21(B), the upper and lower edges of the air bag 93 are respectively folded in a form of bellows along the folding lines L9 into a generally oval configuration as shown in FIG. 21(A). Then, the portions of the air bag 93 near the center thereof are folded toward the front surface of the air bag 93 along the folding lines L10, L11 as shown in FIG. 22(B) so as to form a generally elongated linear folded shape of the air bag 93 having arm portions 96a and 96b on both sides.

Though it is not shown, the air bag 93 is secured to a retainer at the peripheral edge of the opening 94 as in the embodiments described above. The center portion of the folded body of the air bag 93 is disposed at the center of the air bag apparatus for the driver's seat, and the respective arm portions 96a and 96b extend from the center portion to the respective spoke portions along the respective spoke portions. Then, a module cover is mounted to cover the air bag 93 to complete the air bag apparatus for the driver's seat. Other construction and operation of the air bag apparatus for the driver's seat are the same as those of the air bag apparatus for the driver's seat 40 shown in FIG. 5(D) or the air bag apparatus for the driver's seat 60 shown in FIGS. 6 and 7.

As described above, according to the air bag apparatus for the driver's seat of the present invention, the air bag is arranged in such a manner that it extends from the center portion to the spoke portions of the air bag apparatus for the driver's seat, and the air bag is covered with the module cover extending from the center portion to the spoke portions, so that the center portion of the air bag apparatus for the driver's seat can be downsized to a relatively small configuration. Therefore, the steering wheel comprising the air bag apparatus for the driver's seat of a slim design with a small center portion and elongated spoke portions may be formed.

In addition, since the tear lines are formed from the center portion to the spoke portions of the module cover on the backside of the module cover, the module cover can be securely torn from the center portion to the spoke portions.

While the invention has been explained with reference to the specific embodiments of the invention, the explanation is illustrative, and the invention is limited only by the appended claims.

What is claimed is:

1. A method of folding an air bag for a driver, comprising:

placing an air bag in a flat form to orient an upper surface of the air bag upwardly, and folding at least two peripheral side areas of the air bag in the flat form inwardly of the air bag to be arranged close to each other to thereby form a folded center portion and at least two folded arm portions, said folded arm portions extending radially outwardly from the center portion of the air bag to lateral portions on an outer periphery of the air bag without being folded toward the center portion of the air bag and without being substantially bent laterally relative to the folded center portion, said arm portions having elongated shapes extending along spokes of a steering wheel so that the folded center portion of the air bag is located above an inflator disposed at a wheel center portion of the steering wheel and the folded arm portions are located within the spokes.

2. A method of folding an air bag according to claim 1, wherein each of said at least two side areas of the air bag is placed at the center portion and at least two arm portions.

3. A method of folding an air bag according to claim 2, wherein each of said at least two side areas is folded in bellows so that folded portions in a form of bellows extend between the lateral portions through the center portion.

4. A method of folding an air bag according to claim 3, wherein each of said folded portions in a form of bellows has laminated portions and curved portions connecting the laminated portions, said curved portions facing upwardly and downwardly of the air bag.

5. A method of folding an air bag according to claim 3, wherein said folded air bag has four arm portions.

6. A method of folding an air bag according to claim 3, wherein said folded air bag has three arm portions.

7. A method of folding an air bag according to claim 1, wherein at least three side areas of the air bag in the flat form are pushed toward the center portion to form at least three petal-shaped portions extending radially outwardly from the center portion, and side portions of each petal-shaped portion are rolled inwardly to form the arm portion.

8. A method of folding an air bag according to claim 1, wherein each of upper and lower sides of the air bag in the flat form is folded in bellows and disposed on a middle area between the upper and lower sides without overlapping each other to form an elongated form.

9. A method of folding an air bag according to claim 8, wherein four corner areas of the elongated form are bent inwardly at least once to have tapered shapes extending radially outwardly from the center portion.

10. A method of folding an air bag according to claim 8, wherein each of said upper and lower sides folded in bellows are arranged so that top portions of the upper and lower sides face each other.

11. A method of folding an air bag according to claim 1, wherein each of upper and lower sides of the air bag in the flat form is rolled inwardly toward a center area between the upper and lower sides without overlapping each other.

12. A method of folding an air bag according to claim 1, wherein each of upper and lower sides of the air bag in the flat form is folded in bellows to orient outwardly, and each of said upper and lower sides folded in bellows are disposed on a middle area between the upper and lower sides.

* * * * *